United States Patent
Bae et al.

(10) Patent No.: US 11,815,127 B2
(45) Date of Patent: Nov. 14, 2023

(54) WELDED MEMBER FOR PLATED STEEL PLATE EXCELLENT IN WELD ZONE POROSITY RESISTANCE AND FATIGUE PROPERTIES AND METHOD FOR MANUFACTURING THE SAME

(71) Applicant: POSCO, Pohang-si (KR)

(72) Inventors: Gyu-Yeol Bae, Yeonsu-gu Incheon (KR); Tae-Young Lee, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 16/471,781

(22) PCT Filed: Jun. 18, 2018

(86) PCT No.: PCT/KR2018/006856
§ 371 (c)(1),
(2) Date: Jun. 20, 2019

(87) PCT Pub. No.: WO2019/245063
PCT Pub. Date: Dec. 26, 2019

(65) Prior Publication Data
US 2021/0341004 A1   Nov. 4, 2021

(51) Int. Cl.
*B23K 9/02*   (2006.01)
*B23K 9/23*   (2006.01)
*F16B 5/08*   (2006.01)

(52) U.S. Cl.
CPC ............... *F16B 5/08* (2013.01); *B23K 9/02* (2013.01); *B23K 9/23* (2013.01)

(58) Field of Classification Search
CPC .. F16B 5/08; B23K 9/02; B23K 9/173; B23K 9/23
See application file for complete search history.

(56) References Cited

U.S. PATENT DOCUMENTS 9,457,416 B2 * 10/2016 Suzuki ............... B23K 35/0266
9,616,528 B2 *  4/2017 Izutani ................... B23K 9/025
(Continued)

FOREIGN PATENT DOCUMENTS

CN   102548703 A   7/2012
CN   104159700 A   11/2014
(Continued)

OTHER PUBLICATIONS

Translation of JP 2008-161899: worldwide.espacenet.com. Jan. 29, 2022.*
(Continued)

*Primary Examiner* — Michael P Ferguson
(74) *Attorney, Agent, or Firm* — Morgan, Lewis & Bockius LLP

(57) ABSTRACT

Disclosed is a welded member for plated steel plate having excellent weld zone porosity resistance and fatigue properties and a method of manufacturing the same. The welded member for plated steel plate having excellent weld zone porosity resistance and fatigue properties according to an embodiment of the present invention comprises a weld metal portion formed by arc welding and overlapping a first member and a laminated second member so as to partially overlap the first member, wherein the toe angle (θ) of the weld metal portion is 45° or less, and the first member and the second member are plated steel plates.

8 Claims, 2 Drawing Sheets

(56) References Cited

U.S. PATENT DOCUMENTS

| | | | |
|---|---|---|---|
| 10,155,276 B2 * | 12/2018 | Kawamoto | B23K 9/093 |
| 2011/0174784 A1 * | 7/2011 | Kamei | B23K 35/383 |
| | | | 219/74 |
| 2015/0041449 A1 | 2/2015 | Fujiwara et al. | |
| 2015/0096966 A1 * | 4/2015 | Fujiwara | B23K 9/092 |
| | | | 219/130.51 |
| 2015/0231726 A1 * | 8/2015 | Hosomi | B23K 35/383 |
| | | | 219/74 |

FOREIGN PATENT DOCUMENTS

| | | |
|---|---|---|
| JP | H06-285643 A | 10/1994 |
| JP | H07-9149 A | 1/1995 |
| JP | H07-024576 A | 1/1995 |
| JP | H07-24576 A | 1/1995 |
| JP | 2002-066774 A | 3/2002 |
| JP | 2004-223548 A | 8/2004 |
| JP | 2007-253160 A | 10/2007 |
| JP | 2008-161899 A | 7/2008 |
| JP | 2010-142823 A | 7/2010 |
| JP | 2012-081514 A | 4/2012 |
| JP | 2012-101232 A | 5/2012 |
| JP | WO2011-037272 A1 | 2/2013 |
| JP | 5980128 B2 | 8/2016 |
| JP | 2018-069292 A | 5/2018 |
| KR | 10-2014-0122269 A | 10/2014 |
| KR | 10-2016-0077325 A | 7/2016 |
| WO | 2011/037272 A1 | 3/2011 |
| WO | 2017/221865 A1 | 12/2017 |

OTHER PUBLICATIONS

Chinese Office Action dated Sep. 10, 2021 issued in Chinese Patent Application No. 201880009797.8 (with English translation).
Extended European Search Report dated Jul. 20, 2021 issued in European Patent Application No. 18909263.8.
X. Chai, et al., "Gas Metal Arc Welding of Magnesium Alloys: Oxide Films, High Crowns, and Fingers," Welding Journal, Jan. 2015, vol. 94, pp. 16-33.
Indian Office Action dated Oct. 9, 2020 issued in Indian Patent Application No. 201917024693 (with English translation).
Japanese Office Action dated Sep. 1, 2020 issued in Japanese Patent Application No. 2019-534700 (with English translation).
Japanese Office Action dated May 25, 2021 issued in Japanese Patent Application No. 2019-534700.
Korean Notice of Allowance dated Jul. 3, 2019 issued in Korean Patent Application No. 10-2016-0177328 (with English translation).
Chinese Office Action dated Jan. 26, 2021 issued in Chinese Patent Application No. 201880009797.8 (with English translation).
Communication pursuant to Article 94(3) issued in corresponding European Patent Application No. 18 909 263.8 dated Jul. 28, 2023.
Chai et al., "Gas Metal Arc Welding of Magnesium Alloys: Oxide Films, High Crowns, and Fingers", Welding Journal, Jan. 2015, vol. 94.

* cited by examiner

WELDED MEMBER FOR PLATED STEEL PLATE EXCELLENT IN WELD ZONE POROSITY RESISTANCE AND FATIGUE PROPERTIES AND METHOD FOR MANUFACTURING THE SAME

CROSS-REFERENCE OF RELATED APPLICATIONS

This application is the U.S. National Phase under 35 U.S.C. § 371 of International Patent Application No. PCT/KR2018/006856, filed on Jun. 18, 2018, which in turn claims the benefit of Korean Patent Application No. 10-2016-0177328, filed Dec. 23, 2016, the entire disclosures of which applications are incorporated by reference herein.

TECHNICAL FIELD

The present invention relates to a welded member for plated steel plate and a method of manufacturing the same, and more particularly to a welded member for plated steel plate excellent in weld zone porosity resistance and fatigue properties and a method of manufacturing the same.

BACKGROUND ART

In the automobile field, research on weight reduction technology of car bodies and parts has emerged as a major issue in fuel efficiency control policies for environmental protection against such problems as global warming. As chassis components, which are important for the running performance of automobiles, also follow such trend, it is necessary to apply high-strength steel materials for weight reduction. In order to achieve the weight reduction of parts, it is essential to increase the strength of the material, and it can be said that guaranteeing the durability performance of parts made of high-strength steel in an environment where repeated fatigue load is applied is an important factor.

In the case of arc welding, which is mainly used to secure strength in the assembly of automobile chassis parts, lap joint welding is performed between parts by the welding of welding wires, thus formation of geometrical shape of a welded joint is inevitable. This acts as a repeated fatigue stress concentration part (notch effect) and becomes a starting point of fracture, and as a result, the durability performance of the part is reduced, thus the advantage of the application of high strength steel materials is lost.

As described above, in order to improve the fatigue properties of the weld, it is important to reduce the angle of the end of the weld joint, which is mainly a stress concentration part, that is, the toe angle. At the same time, it is important to control the material and stress of a toe part.

In addition, as mentioned above, there is an increasing tendency to increase the adoption of the plated steel material as in prior art 1 due to the increase in the demand for rust prevention properties to prevent penetration corrosion due to the thinning of materials due to the high strength and light weight of the parts. Adoption of the plated steel material is sensitive to the occurrence of pore defects such as pits or blow holes at the time of arc welding, and has the problem of reducing the strength and fatigue properties of the weld.

On the other hand, although the application of Zn—Mg—Al high corrosion resistant alloy plated steel with much higher corrosion resistance than existing hot-dip galvanized steel sheets has been proposed, the melting point and vaporization point of ternary alloy plating are lower than those of conventional zinc plating, the generation of plating vapor is more sensitive, and thus it is necessary to develop a technique to suppress the occurrence of pore defects in the weld.

Although prior art 1 proposes setting a gap of a lap joint portion in the range of 0.2 to 1.5 mm in order to suppress the generation of pore defects of a galvanized steel plate arc welded portion, there is a limit in which the welding characteristics for a joint structure having no clearance can not be guaranteed when the actual part is applied.

Further, in prior art 2, in order to suppress the generation of pore defects in galvanized steel sheet arc welds, it is proposed to apply a triple mixed gas of $CO_2$ and $O_2$ mixed with Ar and a low-viscosity solid wire, which limits the content of Si and Mn. In addition, it is proposed that the arc position is 1 mm at a tip of a welding lap joint. However, the restriction of a protective gas and a welding material is inevitable, and the arc position must be kept constant when the actual part is applied.

(Patent Document 0001) Japanese Patent Laid-Open Publication No. 2016-101593

(Patent Document 0002) Japanese Patent Laid-Open Publication No. 2015-167981

DISCLOSURE

Technical Problem

An embodiment of the present invention seeks to provide a welded member for plated steel plate having excellent weld zone porosity resistance and fatigue properties.

In addition, the embodiments of the present invention seek to provide a method of manufacturing a welded member for plated steel plate having excellent weld zone porosity resistance and fatigue properties.

Technical Solution

A welded member for plated steel plate having excellent weld zone porosity resistance and fatigue properties according to an embodiment of the present invention includes a weld metal portion formed by arc welding and overlapping a first member and a laminated second member so as to partially overlap the first member, wherein the toe angle (θ) of the weld metal portion is 45° or less, and the first member and the second member are plated steel plates.

Also, according to an embodiment of the present invention, the plated steel plate may be a Zn—Mg—Al alloy plated or galvanized hot-rolled steel plate.

Further, according to an embodiment of the present invention, the hot-rolled steel plate may have a tensile strength of 590 MPa or more and a thickness of 6 mm or less.

Also, according to an embodiment of the present invention, the hot-rolled steel plate may be a 590FB steel.

Also, according to an embodiment of the present invention, the pore area ratio of the weld metal portion may be less than 0.5%.

Further, according to an embodiment of the present invention, the fatigue strength of the weld metal portion may be 250 MPa or more, and the fatigue life may be 2,000,000 cycles or more with a cyclic fatigue load of 10 kN (minimum/maximum load ratio, R=0.1).

A method of manufacturing a welded member for plated steel plate having excellent weld zone porosity resistance and fatigue properties according to an embodiment of the present invention includes forming a weld metal portion through arc welding and overlapping a first member and a laminated second member so as to partially overlap the first member, wherein the first member and the second member are plated steel plates, supplying a welding current to a solid wire to generate an arc, wherein the welding current is a pulse current repeated with a first peak and a second peak having a current value smaller than the first peak as one pulse period, and a welding molten metal stirring wave frequency defined by the following formula (1) is 20 To 30 Hz.

$$1/(T_H+T_L) \quad \text{Formula (1)}$$

Here, $T_H$ is a period of the first peak, and $T_L$ is a period of the second peak.

Also, according to an embodiment of the present invention, the solid wire may be fed into a shielding gas which is Ar gas containing 10 to 30% of $CO_2$ gas.

Also, according to an embodiment of the present invention, the welding current may be in the range of 200 to 300 A.

Further, according to an embodiment of the present invention, at the time of arc welding, the diameter of the solid wire may be 1.0 to 1.2 mm, the torch angle may be 30 to 45°, the push angle may be 0 to 25°, and welding speed may be 0.6 to 1.0 m/min.

Also, according to an embodiment of the present invention, the first member and the second member may be Zn—Mg—Al alloy plated or galvanized hot-rolled steel plates.

Further, according to an embodiment of the present invention, the hot-rolled steel sheet may have a tensile strength of 590 MPa or more and a thickness of 6 mm or less.

Advantageous Effects

In the production of a welded member for plated steel plate having excellent weld zone porosity resistance and fatigue properties according to an embodiment of the present invention, pore defects in a weld metal portion can be effectively reduced through optimization of the wave frequency of a welding current. The fatigue stress concentration on a weld toe can be reduced by controlling the toe angle of the weld metal portion. Therefore, a high corrosion resistant coated steel sheet can be used to ensure high strength of parts such as chassis members of automobiles, and rust prevention properties due to the thinning of the parts. Thus, a welded member for plated steel plate having excellent weld zone porosity resistance and fatigue properties can be obtained.

BEST MODE

A welded member for plated steel plate having excellent weld zone porosity resistance and fatigue properties comprising, a weld metal portion formed by arc welding and overlapping a first member and a laminated second member so as to partially overlap the first member, Wherein the toe angle (θ) of the weld metal portion is 45° or less, and the first member and the second member are plated steel plates.

Modes of the Invention

Hereinafter, embodiments of the present invention will be described in detail with reference to the attached drawings. The following examples are presented to fully convey the spirit of the present invention to those skilled in the art to which the present invention belongs. The invention is not limited to the embodiments presented herein, but may be embodied in other forms. The drawings omit illustration of parts not related to the description to clarify the present invention, and the size of components may be expressed in a somewhat exaggerated manner to facilitate understanding.

Figure 1:
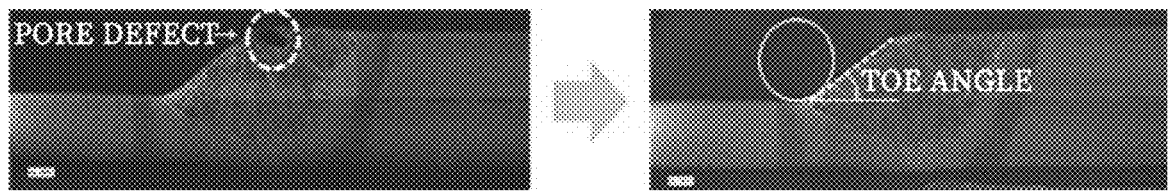
FIG. 1 is a photograph of a cross section of a welded member for plated steel plate having excellent weld zone porosity resistance and fatigue properties according to an embodiment of the present invention.
Figure 2:
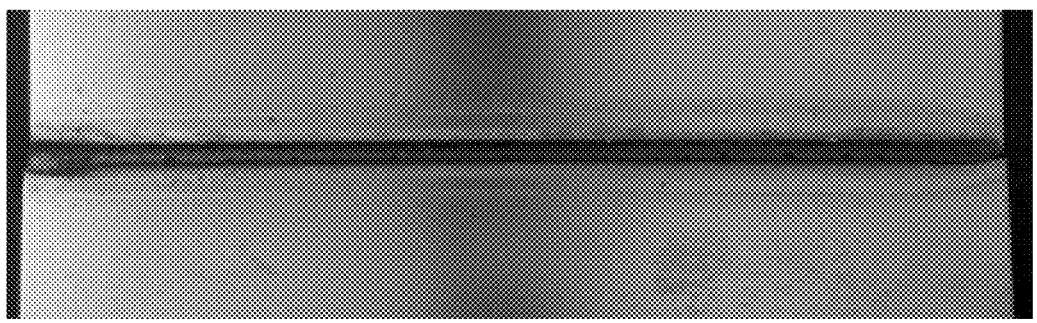
FIG. 2 is a photograph of the appearance of a weld according to an embodiment of the present invention.
Figure 3:
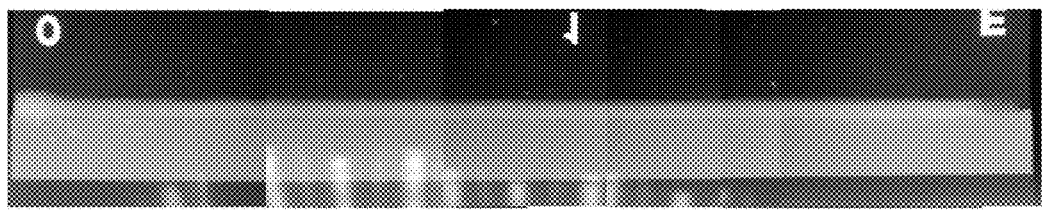
FIG. 3 is an X-ray photograph of the appearance of a weld according to an embodiment of the present invention.
Figure 4:
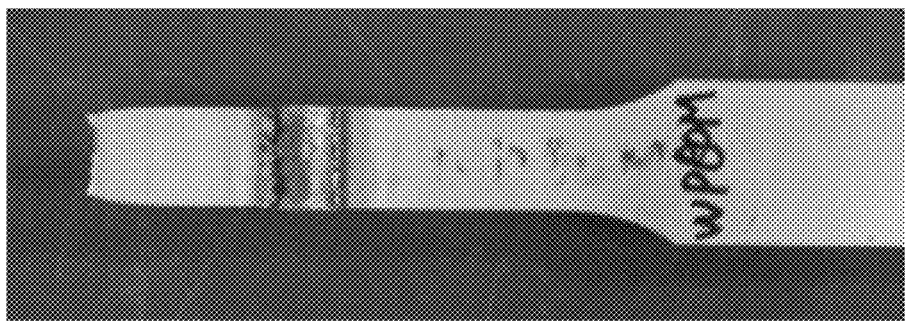
FIG. 4 is a photograph showing tensile fracture test results of a welded member for plated steel plate according to an example of the present invention.
Figure 5:
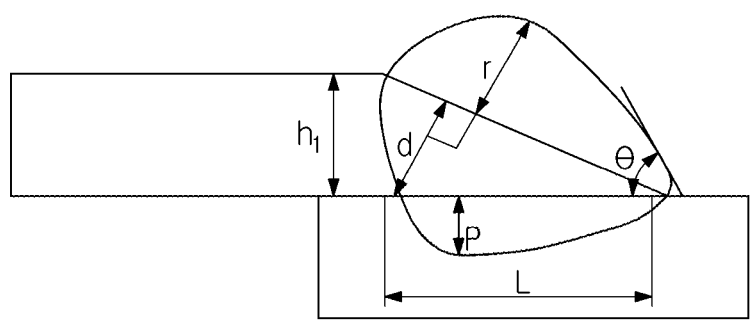
FIG. 5 is a schematic view for explaining a weld metal portion of a welded member for plated steel plate according to an embodiment of the present invention.

FIG. 1 is a photograph of a cross section of a welded member for plated steel plate having excellent weld zone porosity resistance and fatigue properties according to an embodiment of the present invention. FIG. 2 is a photograph of the appearance of a weld according to an embodiment of the present invention. FIG. 3 is an X-ray photograph of the appearance of a weld according to an embodiment of the present invention. FIG. 4 is a photograph showing tensile fracture test results of a welded member for plated steel plate according to an example of the present invention. FIG. 5 is a schematic view for explaining a weld metal portion of a welded member for plated steel plate according to an embodiment of the present invention.

Referring to FIGS. 1 to 5, a welded member for plated steel plate having excellent weld zone porosity resistance and fatigue properties according to an embodiment of the present invention comprises a weld metal portion formed by arc welding and overlapping a first member and a laminated second member so as to partially overlap the first member.

At this time, the toe angle (θ) of the weld metal portion is 45° or less.

Methods of increasing the fatigue properties of the welded member can be broadly classified into methods utilizing residual stress and methods controlling the shape of a bead.

In the case of the present invention, it is an object of the present invention to improve the fatigue properties of the welded member by controlling the bead shape. To this end, the toe angle of the weld metal portion is set to 45° or less, preferably 35° or less (excluding 0°), and more preferably 30° or less (except 0°).

Here, the toe angle refers to an angle formed by the tangent of a bead curvature portion closest to a boundary line between the first member and the second member and a weld toe of the weld metal portion, with the weld toe as a reference point. At this time, a contact point where the boundary line between the first member and the second member and the weld metal portion in the cross section perpendicular to a weld line is defined as the weld toe.

By forming the toe angle at 45° or less, the stress concentrated on the weld metal portion can be relieved, and along with this, the fatigue properties of the weld member can be improved.

By controlling the toe angle of the weld metal portion as described above, it is possible to improve the fatigue characteristics of the weld portion. However, in order to maximize the effect, it is preferable to appropriately control the penetration depth of the weld metal portion. According to an embodiment of the present invention, the penetration depth of the weld metal portion can be controlled to 20% or more of the thickness of the second member. More preferably, the penetration depth of the weld metal portion can be controlled to 45% or more of the thickness of the second member. If the penetration depth of the weld metal portion is insufficient, the fatigue load may cause breakage of the weld metal portion starting from a bead route due to the repeated fatigue load.

Further, the first member and the second member are plated steel plates.

Therefore, by using the plated steel plate instead of a general hot-rolled steel plate, it is possible to secure rust prevention properties to prevent penetration corrosion due to the thinning of materials due to the high strength and light weight of parts.

For example, the plated steel plate may be a Zn—Mg—Al based alloy plated or galvanized hot-rolled steel plate. More preferably, the plated steel plate may be a hot-rolled steel sheet plated with a Zn—Mg—Al alloy, which is more corrosion resistant than the galvanized hot-rolled steel sheet.

For example, the hot-rolled steel plate may have a tensile strength of 590 MPa or more and a thickness of 6 mm or less, and the hot-rolled steel plate may be 590FB steel whose microstructure includes ferrite and bainite.

For example, the pore area ratio formed in the weld metal portion may be less than 0.5%.

In the case of welding the welded member for plated steel plate according to the conventional arc welding method, a large amount of pore defects such as pits or blow holes are generated due to the generation of plating vapor when a plated layer comes in contact with the welding arc, and there is a problem in that strength and fatigue properties of a welded portion are lowered.

In addition, in the case of Zn—Mg—Al type high corrosion resistant alloy plated steel sheet superior in corrosion resistance compared to an existing zinc-coated steel sheet, the melting point and vaporization point of ternary alloy plating are much lower. Therefore, there is a problem in that the amount of plating vapor generated is larger and the rate of occurrence of pore defects is higher.

However, according to the manufacturing method including arc welding according to one embodiment of the present invention, not only an existing galvanized steel sheet but also the Zn—Mg—Al high corrosion resistant alloy plated steel sheet is used to minimize such problems. In any case, the pore area ratio of the weld metal portion can be limited to less than 0.5%, preferably to 0%.

For example, the fatigue strength of the weld metal portion is 250 MPa or more, and a fatigue life of 2,000,000 cycles or more can be secured with a cyclic fatigue load of 10 kN (minimum/maximum load ratio, R=0.1). It can be seen that the part fatigue properties are excellent. At this time, the fatigue strength (or fatigue limit) is defined as a value obtained by dividing the maximum fatigue load value at which the fatigue life becomes 2,000,000 cycles or more by the cross-sectional area of the member.

According to a method of manufacturing the welded member for plated steel plate having excellent weld zone porosity resistance and fatigue properties, the method includes a step of forming the weld metal portion through arc welding and overlapping the first member and the second member laminated so as to partially overlap the first member.

First, after preparing the first member and the second member, a welding line is formed by laminating the second member on the first member so that at least a part thereof is overlapped. Here, the welding line means the end of the second member in an area where the first member and the second member overlap.

The overlapping width of a welded joint portion may be about 5 to 50 mm, but is not limited thereto.

At this time, the arc welding is performed while providing a shielding gas along the formed welding line, and at the time of the arc welding, a welding current is supplied to a solid wire to generate an arc for welding.

For example, the solid wire can be fed into the shielding gas which is Ar gas containing 10-30% $CO_2$ gas. More preferably, the shielding gas may be Ar gas containing 10 to 20% of $CO_2$ gas.

That is, the shielding gas is Ar gas and contains 10 to 30% of $CO_2$ gas. If the content of $CO_2$ gas is less than 10%, the effect of arc heat pinch force due to arc contraction is reduced, and the effect of discharging the plating vapor is lowered. If the content of $CO_2$ gas is more than 30%, the effect of the arc heat pinch force due to arc expansion is excessive, and the effect of discharging the plating vapor is lowered.

When the first member and the second member to be welded are plated steel plates, for example, in the case of galvanized steel plates, a galvanized layer, which has a low boiling point due to arc heat during arc welding, floats to the upper part of a molten part as zinc gas.

Most of the zinc is released, but a part thereof remains in the molten part, and a pit which is a small pit when the solidification of the zinc gas near the surface of a base material is formed. Most of the zinc gas is released, but a part of the zinc gas remains in the molten part, and a spherical bubble hole is formed at the time of solidification, and a pit is formed when the zinc gas coagulates near the surface of the base material.

For example, by using Ar gas containing $CO_2$ gas as the shielding gas, it is possible to drastically weld the weld under the solid wire by increasing the arc force generated between the solid wire and the base material in gas shield arc welding. As a result, the discharge of the zinc gas generated in the lower portion of the molten metal portion can be facilitated, and the depth of penetration of the weld metal portion can be further increased during the gas shield arc welding. Ultimately, it is possible to suppress the occurrence of pitting defects and improve the fatigue properties of the welded portion.

As the welding material, the solid wire can be used. For example, ER70S-3 (KC-25M) 1.2 solid wire can be applied, but it is not particularly limited thereto.

For example, the welding current is a pulse current repeated with a first peak and a second peak having a current value smaller than the first peak as one pulse period.

The pulse current is repeatedly supplied at a welding molten metal stirring wave frequency of 20 to 30 Hz defined by the following equation (1) to perform welding.

$$1/(T_H+T_L) \qquad \text{Formula (1)}$$

Here, $T_H$ is a period of the first peak, and $T_L$ is a period of the second peak.

Figure 6:
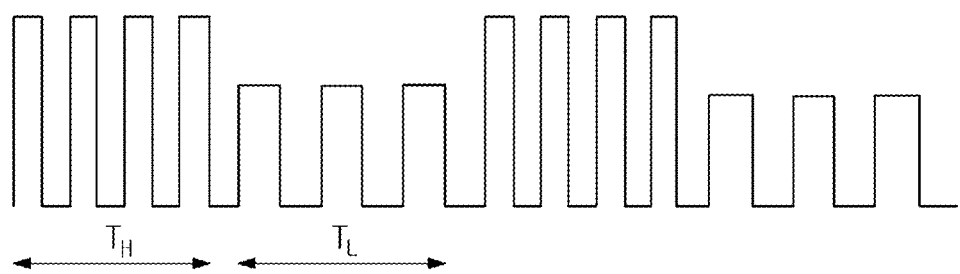
FIG. 6 is a graph for explaining a molten metal agitation wave frequency at the time of arc welding of a welded member for plated steel plate according to an embodiment of the present invention.

FIG. 6 is a graph for explaining a molten metal agitation wave frequency at the time of arc welding of a welded member for plated steel plate according to an embodiment of the present invention.

The welding molten metal stirring wave frequency is defined as $1/(T_H+T_L)$ as shown in FIG. 6. Due to this, the pulse current is supplied repeatedly in the range of 20 to 30 Hz. If this frequency range is excessively low or high, the effect of discharging the plating vapor may be reduced, which may make it difficult to reduce the pore defects.

For example, the welding current may be in the range of 200-300 A.

More preferably, the lower limit of the welding current may be 225 A or more, and the upper limit may be 270 A or less. If the current is too low, the effect of discharging plating steam drops due to the decrease of the arc power. On the other hand, if the current is too high, the weld metal portion becomes unstable and the incidence of pore defects increases.

For example, in the arc welding, the diameter of the solid wire may be 1.0 to 1.2 mm, the torch angle may be 30 to 45°, the push angle may be 0 to 25°, and the welding speed may be 0.6 to 1.0 m/min.

In the embodiment of the present invention, although a gap of the welded joint is 0 mm, it is not limited thereto.

Further, the first member and the second member may be Zn—Mg—Al alloy plated or galvanized hot-rolled steel plates. And the hot-rolled steel sheet may have a tensile strength of 590 MPa or more and a thickness of 6 mm or less. The detailed description of the first member and the second member is the same as that described above, and thus will not be described.

Hereinafter, the present invention will be described in more detail through examples.

Inventive Examples 1 to 4 and Comparative Examples 1 to 6

Two 2.2 mm thick 590FB sheets plated with Zn—Mg—Al with a plating amount of 90 g/m² were placed on both sides of the steel plates so that they overlapped each other by 20 mm. Then, connection parts were welded by arc welding according to the conditions shown in Table 1 below.

TABLE 1

| | Shielding gas | Welding materials | Welding condition | Welding pulse(Hz) current frequency (Hz) |
|---|---|---|---|---|
| Inventive Example 1 | Ar + 20% $CO_2$ | KC-25Mφ 1.2 | 200A, 60 cm/min | 30 |
| Inventive Example 2 | Ar + 20% $CO_2$ | KC-25Mφ 1.2 | 225A, 60 cm/min | 30 |
| Inventive Example 3 | Ar + 20% $CO_2$ | KC-25Mφ 1.2 | 225A, 80 cm/min | 30 |
| Inventive Example 4 | Ar + 20% $CO_2$ | KC-25Mφ 1.2 | 225A, 100 cm/min | 30 |
| Comparative Example 1 | Ar + 30% $CO_2$ | MIX-ZnΦ 1.0 | 200A, 80 cm/min | 20 |
| Comparative Example 2 | Ar + 30% $CO_2$ | MIX-ZnΦ 1.0 | 220A, 80 cm/min | 20 |
| Comparative Example 3 | Ar + 20% $CO_2$ | KC-25Mφ 1.2 | 200A, 100 cm/min | 0 |
| Comparative Example 4 | Ar + 20% $CO_2$ | KC-25Mφ 1.2 | 300A, 100 cm/min | 0 |
| Comparative Example 5 | Ar + 20% $CO_2$ | KC-25Mφ 1.2 | 200A, 60 cm/min | 20 |
| Comparative Example 6 | Ar + 20% $CO_2$ | KC-25Mφ 1.2 | 250A, 80 cm/min | 20 |

The presence of pits and the pore area ratio were measured by observing the weld metal portion of the welded member, and are shown in Table 2 below.

TABLE 2

| | Pitting occurrence | Pore area ratio(%) |
|---|---|---|
| Inventive Example 1 | X | 0.0 |
| Inventive Example 2 | X | 0.0 |
| Inventive Example 3 | X | 0.0 |
| Inventive Example 4 | X | 0.0 |
| Comparative Example 1 | ○ | 2.5 |
| Comparative Example 2 | ○ | 7.4 |
| Comparative Example 3 | ○ | 1.6 |
| Comparative Example 4 | ○ | 4.1 |
| Comparative Example 5 | ○ | 0.6 |
| Comparative Example 6 | ○ | 2.4 |

FIG. 5 is a schematic view for explaining a weld metal portion of a welded member for plated steel plate according to an embodiment of the present invention.

In FIG. 5, the width of the weld metal portion, that is, the leg length is L, the thickness of the second member is h1, the distance from a straight line from an upper surface edge of the second member to a toe portion on the first member to a contact point of the first and second members and the weld metal portion is represented by d, the distance to the highest surface of the weld metal portion is r, and the penetration depth is p, respectively. Table 3 shows the results of observation of the size of the weld metal portion according to an embodiment of the present invention.

TABLE 3

| | h1 (mm) | L (mm) | r (mm) | d (mm) | p (mm) | Toe angle(°) |
|---|---|---|---|---|---|---|
| Inventive Example 1 | 2.2 | 6.0 | 1.8 | 1.6 | 1.2 | 38 |
| Inventive Example 2 | 2.2 | 6.2 | 1.8 | 1.6 | 1.4 | 33 |
| Inventive Example 3 | 2.2 | 5.9 | 1.8 | 1.7 | 2.1 | 30 |
| Inventive Example 4 | 2.2 | 4.8 | 1.4 | 1.7 | 1 | 44 |

Referring to the above contents, the toe angle of the weld metal portion of the weld member according to an embodiment of the present invention can be maintained at 45° or less, and pits and pores are not generated in the welded metal portion, thus the porosity resistance of the welded member for plated steel plate can be improved.

The strength of the welded metal portion can be secured to 250 MPa or more, and the application range of the high strength plated hot rolled thin plate steel for the purpose of making parts such as automobile chassis members etc. thinner and lighter can be increased.

INDUSTRIAL APPLICABILITY

The welded member for plated steel plate having excellent weld zone porosity resistance and fatigue properties and its manufacturing method according to the embodiments of the present invention can be applied to parts such as an automobile chassis member.

The invention claimed is:

1. A weld joint between plated steel plates having weld zone porosity resistance and fatigue properties comprising:
   a weld joint bead formed by arc welding and overlapping a first member and a laminated second member so as to partially overlap the first member,
   wherein a toe angle (θ) of the weld joint bead is 45° or less, and the first member and the second member are plated steel plates, wherein a pore area ratio of the weld joint bead is less than 0.5%, wherein the fatigue strength of the weld joint bead is 250 MPa or more, and the fatigue life is 2,000,000 cycles or more with a cyclic fatigue load of 10 kN (minimum/maximum load ratio, R=0.1), wherein penetration depth of the weld joint bead is 40% or more compared to the thickness of the second member, the weld joint bead formed by an arc welding process in which a welding current is a pulse current repeated with a first peak and a second peak as one pulse period, wherein:

a welding molten metal stirring wave frequency defined by the formula $1/(T_H+T_L)$ is 20 to 30 Hz, wherein $T_H$ is a period of the first peak, and $T_L$ is a period of the second peak, wherein a welding current is in the range of 200 to 300 A, and wherein a welding speed is: 0.6 to 1.0 m/min.

2. The weld joint between plated steel plates according to claim 1, wherein the plated steel plates are Zn—Mg—Al alloy plated or galvanized hot-rolled steel plates.

3. The weld joint between plated steel plates according to claim 2, wherein the hot-rolled steel plates have a tensile strength of 590 MPa or more and a thickness of 6 mm or less.

4. The weld joint between plated steel plates according to claim 3, wherein the hot-rolled steel plates are 590FB steel.

5. The weld joint between plated steel plates according to claim 1, wherein the weld joint bead is formed by an arc welding process in which solid wire is fed into a shielding gas which is Ar gas containing 10 to 30% of $CO_2$ gas.

6. A weld joint between plated steel plates having weld zone porosity resistance and fatigue properties comprising:

a weld metal portion formed by arc welding and overlapping a first member and a laminated second member so as to partially overlap the first member, wherein a toe angle (θ) of the weld joint bead is 45° or less, and the first member and the second member are plated steel plates, wherein a pore area ratio of the weld joint bead is less than 0.5%, wherein the fatigue strength of the weld joint bead is 250 MPa or more, and the fatigue life is 2,000,000 cycles or more with a cyclic fatigue load of 10 kN (minimum/maximum load ratio, R=0.1), wherein penetration depth of the weld joint bead is 45% or more compared to the thickness of the second member, and the weld joint bead formed by an arc welding process in which a welding current is a pulse current repeated with a first peak and a second peak as one pulse period, wherein:

a welding molten metal stirring wave frequency defined by the formula $1/(T_H+T_L)$ is 20 to 30 Hz, wherein $T_H$ is a period of the first peak, and $T_L$ is a period of the second peak, wherein a welding current is in the range of 200 to 300 A, and wherein a welding speed is: 0.6 to 1.0 m/min, and wherein a solid wire is fed into a shielding gas which is Ar gas containing 10 to 30% of $CO_2$ gas in forming the weld joint bead formed by arc welding.

7. The weld joint between plated steel plates according to claim 6, wherein the plated steel plates are Zn—Mg—Al alloy plated or galvanized hot-rolled steel plates.

8. The weld joint between plated steel plates according to claim 7, wherein the hot-rolled steel plates have a tensile strength of 590 MPa or more and a thickness of 6 mm or less.

* * * * *